(12) United States Patent
Sasama (10) Patent No.: US 7,345,796 B2
(45) Date of Patent: Mar. 18, 2008

(54) IMAGE SCANNER FOR USE IN IMAGE FORMING APPARATUS

(75) Inventor: Kazuo Sasama, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1032 days.

(21) Appl. No.: 10/268,698

(22) Filed: Oct. 11, 2002

(65) Prior Publication Data

US 2004/0070796 A1 Apr. 15, 2004

(51) Int. Cl.
*H04N 1/04* (2006.01)

(52) U.S. Cl. .................. 358/488; 358/474; 358/444; 358/475; 358/486; 358/497

(58) Field of Classification Search ........... 358/474, 358/497, 494, 486, 488, 471, 505, 501, 401, 358/475, 487, 483, 482, 444, 509, 512–514; 250/234–236, 216, 208.1, 505, 506, 524; 382/312, 318, 319, 255, 274, 245; 399/211, 399/212

See application file for complete search history.

(56) References Cited

U.S. PATENT DOCUMENTS

| RE31,370 | E  | * | 9/1983  | Mashimo et al. | 396/110 |
|----------|----|---|---------|----------------|---------|
| 5,767,989 | A  | * | 6/1998  | Sakaguchi      | 358/474 |
| 6,157,468 | A  | * | 12/2000 | Tsai et al.    | 358/488 |
| 6,587,227 | B1 | * | 7/2003  | Fullerton      | 358/474 |
| 6,603,580 | B1 | * | 8/2003  | Taillie        | 358/474 |
| 6,762,861 | B2 | * | 7/2004  | Lan            | 358/475 |

FOREIGN PATENT DOCUMENTS

| JP | 4-287561 A   | 10/1992 |
| JP | 2001-216467 A | 8/2001 |

OTHER PUBLICATIONS

U.S. Appl. No. 09/671,152, filed Jan. 16, 2001, Sasama.

* cited by examiner

*Primary Examiner*—Cheukfan Lee
(74) *Attorney, Agent, or Firm*—Foley & Lardner LLP (57) ABSTRACT

An image scanner of the present invention corrects a lens position when a lens moving signal for moving a lens is obtained by extracting a luminance signal from an image signal output from a CCD sensor and an object is dislocated from a focus position of the lens at an optional position.

14 Claims, 6 Drawing Sheets

IMAGE SCANNER FOR USE IN IMAGE FORMING APPARATUS

BACKGROUND OF THE INVENTION

The present invention relates to an image scanner for obtaining image data for use in an electrophotographic image forming apparatus and an image forming apparatus having the image scanner.

An image scanner obtains image data by photoelectrically converting reflected light obtained by illuminating an object such as a sheet-like original, book, and three-dimensional object.

The image scanner includes an original holding portion (original document table) for holding an object and an illuminating unit has an illuminating lamp for illuminating the object put on the original document table, a charged-coupled device (CCD) sensor serving as an image scanning sensor, and an optical set (plural mirrors and reducing glass lenses) provided between the original document table and the CCD sensor to image the light reflected from the object on the CCD sensor. In the case of an analog electrophotographic apparatus in which an exposure mirror and a photosensitive drum are arranged instead of a CCD sensor to directly lead light reflected from an object to the photosensitive drum, an original document table (original holding portion), illuminating unit, and optical set have similar configurations.

When scanning the image of an object such as a book by the above image scanner, the entire region to be scanned does not always closely contact with an original document table. That is, when an object is a book, a portion of a binding margin frequently rises from the original document table.

In the case of the above system of moving an illuminating unit along an original document table and imaging light reflected from an object, i.e., image information on the object on a line sensor, the image information imaged on the line sensor is imaged on a light-receiving face of the line sensor at a focus fixed to an original document table. In other words, when the object set to the original document table has a portion which does not closely contact with the original document table, the image of the portion is unfocused and imaged on the line sensor.

In this case, a problem occurs that the sharpness of an output image signal is deteriorated and thereby, the image cannot be identified or image information cannot be obtained.

Though an image scanner for always imaging an input surface image on a photoelectric conversion element by moving an image imaged on a line sensor or the photoelectric conversion element and a lens in accordance with a distance between an original document table and an original is disclosed in Jpn. Pat. Appln.

KOKAI Publication No. 4-287561, a focus is generally adjusted every page or line. Therefore, also in the case of an image scanner provided with a mechanism capable of adjusting the focus of image information, a focus is controlled every page or line. Thus, in the case of scanning regions whose heights on an original document table are different from each other in a main scanning direction parallel to a longitudinal direction of a line sensor, a problem occurs that a uniform sharpness cannot be obtained because a focus is dislocated.

BRIEF SUMMARY OF THE INVENTION

It is an object of the present invention to provide an image scanner capable of setting a focus every specific region when scanning image information for one page or one line.

According to an aspect of the present invention, there is provided an image scanner comprising:

a photoelectric conversion element which has a light-receiving face and outputs an electrical signal corresponding to the contrast of light emitted to the light-receiving face;

an optical unit including a light source, a lens, and a plurality of mirrors which guide the light reflected from an object to which the light from the light source is emitted and thereby which is illuminated, the lens imaging the reflected light on the light-receiving face of the photoelectric conversion element;

a photoelectric conversion element driving circuit which drives the photoelectric conversion element and fetches the electrical signal at a predetermined timing;

a lens moving mechanism which moves the lens in an optical-axis direction by a predetermined distance; and a focus control circuit which generates a focus signal capable of setting an optimum position of the lens in accordance with the electrical signal output from the photoelectric conversion element and which outputs a lens moving signal showing a distance for the lens moving mechanism to move the lens in accordance with the focus signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIGS. 6A to 6C are schematic views for explaining an example of the auto focus control for achieving the first embodiment of the image scanner shown in FIG. 4A, in which

DETAILED DESCRIPTION OF THE INVENTION

Hereafter, an example of an image forming apparatus to which an example of an embodiment of an image scanner of the present invention can be applied is described by referring to the accompanying drawings.

Figure 1:
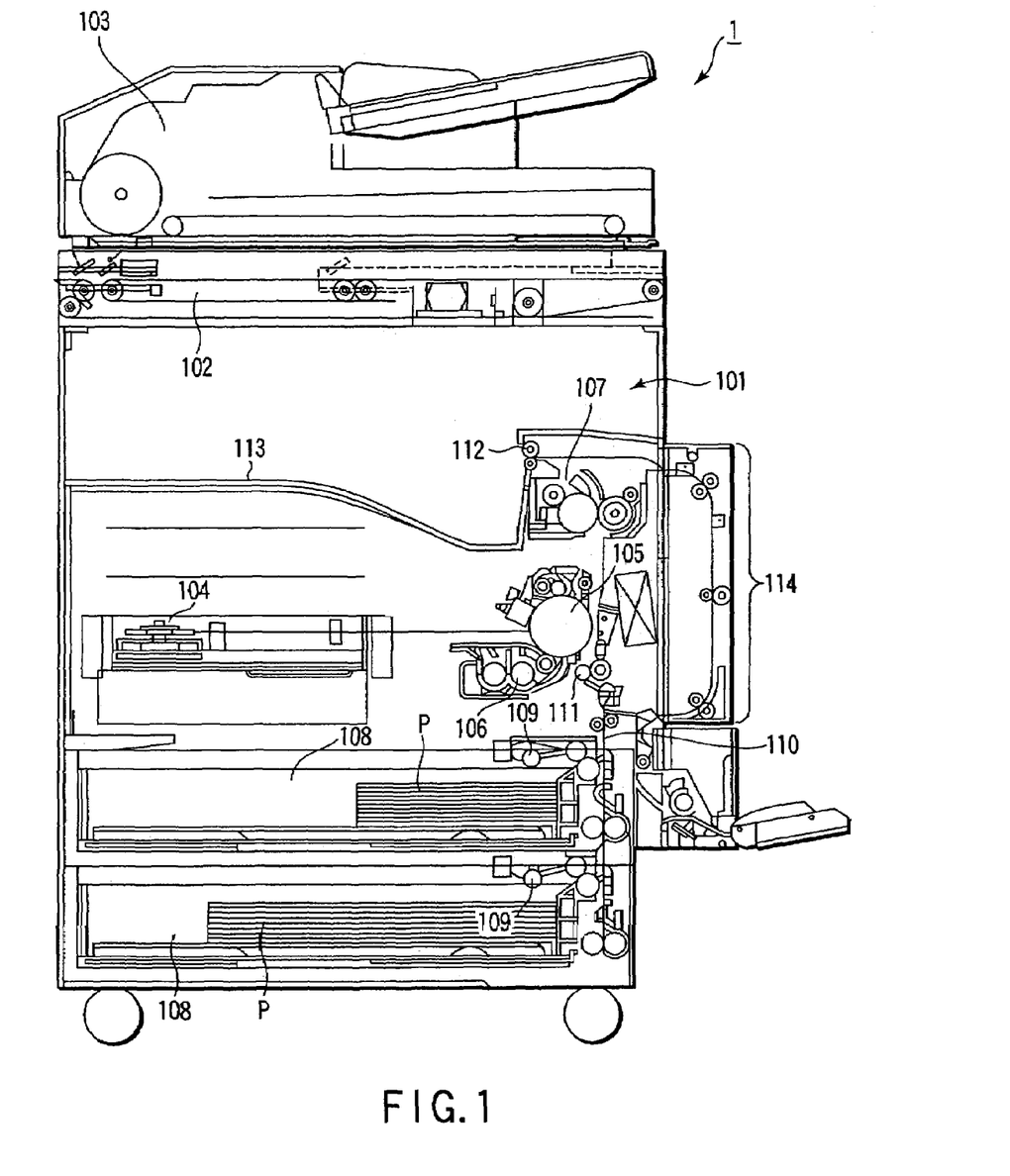
FIG. 1 is a schematic view for explaining an example of an image forming apparatus in which an image scanner of the present invention is incorporated.

As shown in FIG. 1, a digital copying machine 1 is constituted by a scanner (image scanner) 101 and an image forming section 102. The scanner 101 is integrally provided with an automatic document feeder (ADF) 103 for successively replacing copying objects in accordance with the reading operation for reading image information from copying objects when the copying objects are sheet-like.

The image forming section 102 has a exposure unit 104, a photosensitive drum 105, a developing unit 106, a fixing unit 107, and the like.

In the case of the above copying machine 1, a laser beam whose light intensity is changed in accordance with image information is applied to the outer periphery of the photosensitive drum 105 previously charged to a predetermined potential from the exposure unit 104.

Thereby, an electrostatic image corresponding to an image to be copied, i.e., an electrostatic latent image is formed at a predetermined position of the photosensitive drum 105.

An electrostatic latent image (not shown) formed on the photosensitive drum 105 is developed when an unillustrated toner, i.e., developer is selectively supplied only to the latent image from the developing unit 106 and converted into an unillustrated developer image, i.e., toner image. The toner image (not shown) formed on the surface of the photosensitive drum 105 is transferred to sheet P housed in a sheet cassette 108 at a transfer position opposite to a transferring unit which is not provided with a symbol.

The sheet P is taken out from the sheet cassette 108 one by one by a pickup roller 109 and carried toward the photosensitive drum 105 through a carrying path 110.

A sheet P currently carried through the carrying path 110 is temporarily stopped by an aligning roller 111 such that the position of the toner image on the sheet P held by the photosensitive drum 105 coincides with the position of the image of the copying object, timings are matched, and the sheet P is guided to the transfer position where a transferring unit which is not described in detail is opposite to the photosensitive drum 105.

A toner (not shown) transferred to the sheet P is carried to the fixing unit 107 due to the movement of the sheet P and fixed to the sheet.

The sheet P on which the unillustrated toner, i.e., the copied image of the image of the original document or an output image corresponding to image information supplied from an external unit is fixed is ejected to a space defined between the scanner 101 and the cassette 108, i.e., an image output medium holding section (tray) 113 by an ejection roller 112.

Though not described in detail, when image formation on the both sides of one sheet is designated, a sheet on which toner is fixed by the fixing unit 107 is carried to a sheet inverting mechanism 114 capable of inverting the surface and back of the sheet because the ejection roller 112 is temporarily inversely rotated.

Namely, when image formation on the both sides of one sheet is designated, the surface and back of the sheet on one side of which toner is already fixed are inverted by the sheet inverting mechanism 114 and then the sheet is supplied toward the aligning roller 111. Thereafter, because the aligning roller 111 is rotated at a predetermined timing, the sheet is supplied toward a transfer region opposite to the drum 105 such that the toner image can be transferred to the back (side on which toner is not fixed) of the sheet.

Figure 2:
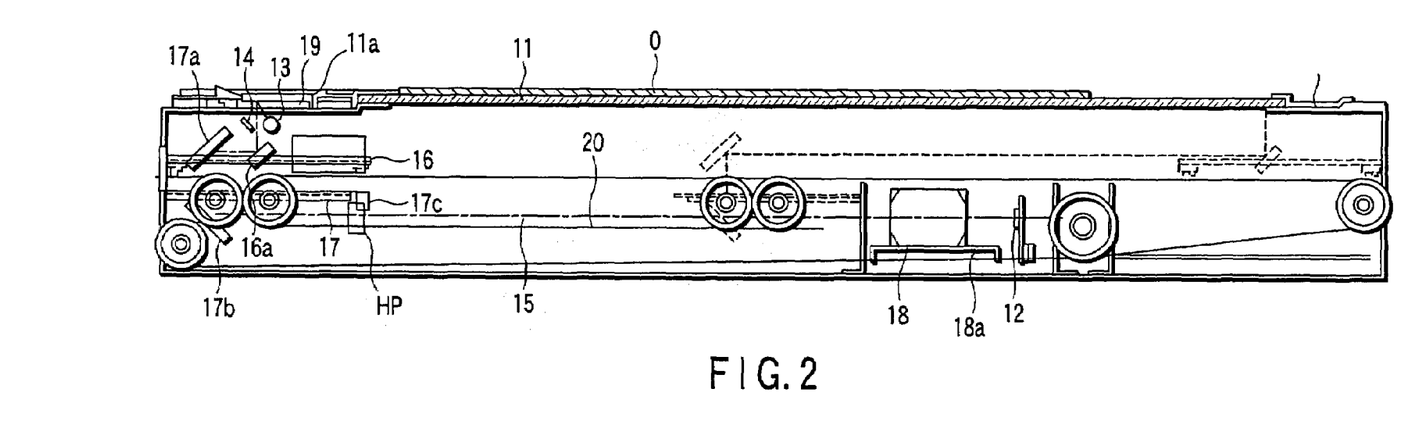
FIG. 2 is a schematic view for explaining an example of an image scanner to be incorporated in the image forming apparatus shown in FIG. 1.

FIG. 2 is a schematic view for explaining an example of an image scanner to be incorporated in the image forming apparatus shown in FIG. 1.

As shown in FIG. 2, the image scanner 101 is formed by a material through which light passes such as glass and provided with a transparent flat original document table 11 having an almost uniform thickness. The original document table 11 holds a copying object, i.e., an original document O. A CCD sensor 12 for converting image information on the original document O to be transmitted into an electrical signal is set to a predetermined position in the scanner 101 below the original document table 11. The image information on the original document O set to the original document table 11 is transmitted to the CCD sensor 12 through a plurality of mirrors which are explained below.

An illuminating lamp 13 for emitting light toward the original document table 11 and first and second reflecting members 14a and 14b for condensing the light emitted from the illuminating lamp 13 to a predetermined position of the original document table 11 are provided at a pace along the original document table 11 below the original document table 11. The illuminating lamp 13 and the first and second reflecting members 14a and 14b are respectively moved on a rail 15 and thereby, fixed to a first carriage 16 capable of reciprocating along the face of the original document table 11.

The first carriage 16 is provided with a first image mirror 16a for guiding the light reflected from the original document O illuminated by the light from the illuminating lamp 13 and two reflecting members 14a and 14b, that is, the image information on the original document O in a predetermined direction.

The image information on the original document O can be obtained as the contrast of the light produced due to the fact that a non-image portion and an image portion are different from each other in reflectance when an image included in the original document O is illuminated. Therefore, the CCD sensor 12 converts the contrast of the light corresponding to the image of the illuminated original document into an electrical signal. The light followed by the contrast to be guided to the CCD sensor is hereafter referred to as image light.

Figure 3:
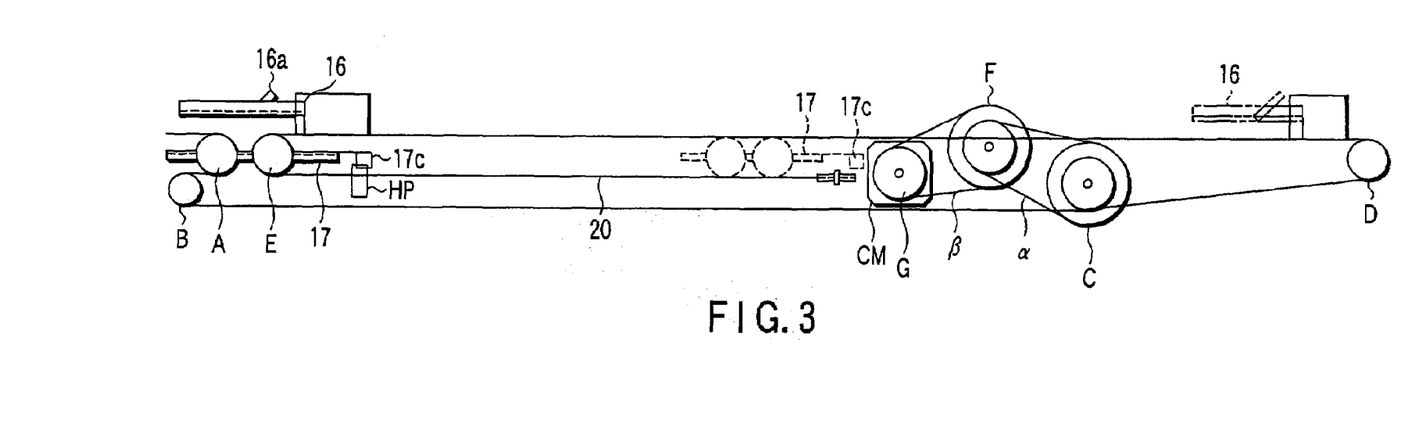
FIG. 3 is a schematic view for explaining an example of a driving mechanism for reciprocating first and second carriages along an original document table in the image scanner shown in FIG. 2.

A second carriage 17 to be moved by following the first carriage 16 is provided in the direction in which the image light is reflected by the first image mirror 16a in the vicinity of the first carriage 16. The first and second carriages 16 and 17 are reciprocated on the rail 15 because a motor CM, which is described later by referring to FIG. 3, is rotated.

A switch plate 16c making it possible to detect the present position of the first carriage 16 by using a home position sensor HP described below is set to a predetermined position of the first carriage 16. The switch plate 16c is represented by a longitudinal end of the first image mirror 16a and set in a region not influencing image light when the first and second carriages 16 and 17 are moved on the rail 15.

The home position sensor HP is set to a frame (not described in detail) of the image scanner 101 or a predetermined position in the vicinity of the rail 15 to detect that the switch plate 16c passes or arrives. It is possible to detect the moving distance (present position) of the first carriage 16 by counting the number of motor-driving pulses input to the motor CM (refer to FIG. 3) on the basis of the point of time when it is detected by the home position sensor HP that the switch plate 16c passes or arrives.

The second carriage 17 is provided with a first image mirror 16a, a second image mirror 17a, and a third image mirror 17b, each bending image light every 90°. The image light is guided to a lens 18 by these three mirrors, and a predetermined imaging magnification is provided for the image light by the lens 18 and imaged on the CCD sensor 12 set at the focus position of the lens 18.

The lens 18 is fixed to a lens mount 18a. The lens mount 18a receives an impulsive force from a lens motor LM through a driving mechanism 18b represented by a gear string or a worm wheel and worm gear (not described in detail) and thereby, movable in the optical axis direction by a predetermined distance from a reference position.

In other words, when a factor occurs in which a focus is dislocated, for example, the fact that the original document O does not closely contact with the original document table 11 occurs, the lens 18 can be moved in the optical-axis direction in order to adjust the focus.

FIG. 3 is a schematic view for explaining a driving mechanism for reciprocating the first and second carriages of the image scanner shown in FIG. 2 along the original document table.

As shown in FIG. 3, the first and second carriages 16 and 17 of the image scanner 101 are moved along the original document table 11 at a predetermined speed corresponding to a reading magnification because the rotation of the driving motor CM is transmitted by a wire rope 20.

For example, the wire rope 20 is extended from the fixed end of a frame (not described in detail) to a pulley A of the second carriage 17, and the direction of the rope 20 is almost inverted and inverted again by a fixed pulley B. The rope is then wound on a fixed pulley C (winding pulley) to which the rotation of the driving motor CM is transmitted by an optional number of times, and the direction is inverted again by a pulley D at the other end of the frame, extended to a pulley E of the second carriage 17, and fixed. The pulley C is a deceleration pulley which is rotated at a predetermined speed in accordance with the rotation of a motor pulley G set to the shaft of the driving motor CM decelerated through a plurality of transmission elements such as a plurality of toothed belts and an intermediate deceleration pulley F.

Moreover, the first carriage 16 is fixed to the wire rope 20 between the pulley E of the second carriage 17 and the pulley D set to the frame. Therefore, as described above, the second carriage 17 is moved by a distance ½ the distance by which the first carriage 16 is moved at a speed ½ the speed at which the first carriage 16 is moved.

Figure 4A:
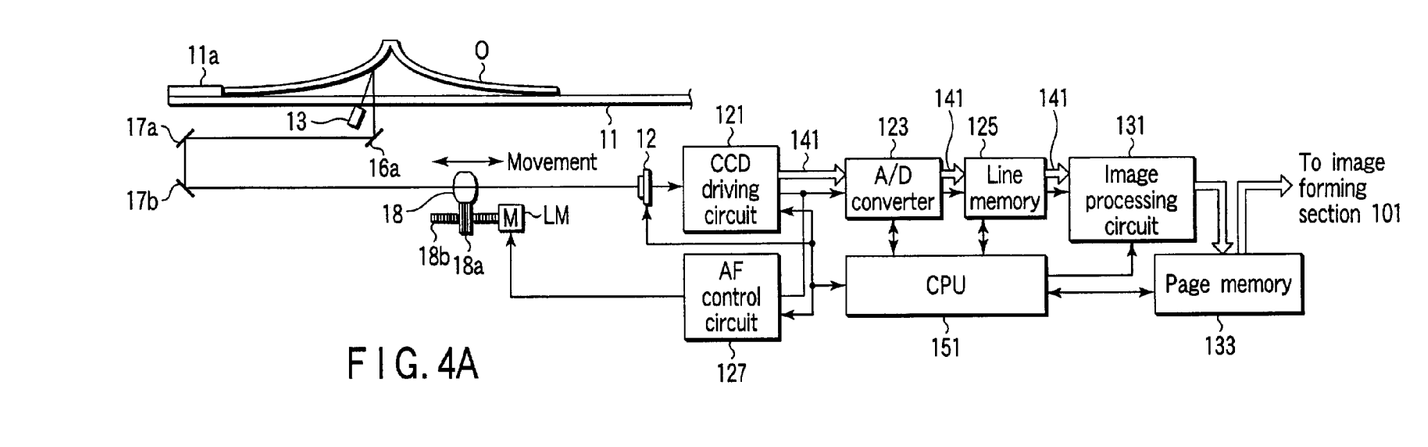
FIG. 4A is a schematic diagram for explaining an example of a first embodiment of the image scanner shown in FIGS. 2 and 3.
Figure 4B:
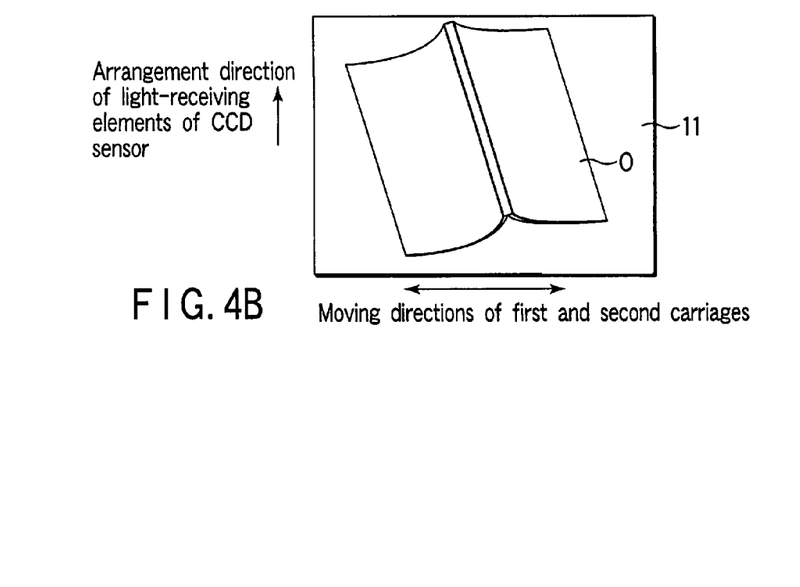
FIG. 4B is a schematic view showing a case in which an object is mounted on the original document table of the image scanner shown in FIGS. 2 and 3 such that a center line of a binding margin of the object becomes unparalleled to a front end of the original document table.
Figure 4C:
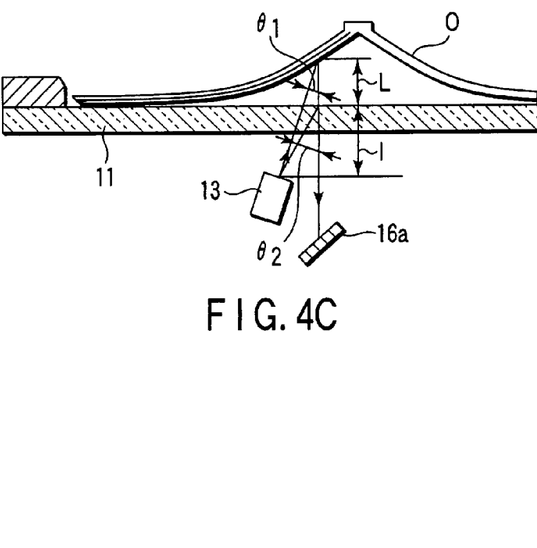
FIG. 4C is a schematic view for explaining the relation for correcting a position of a lens for a position at which the object not closely contacting with the original document table is illuminated by light emitted from a light source.

FIG. 4A is a schematic diagram for explaining a state in which image light emitted from a copying object having a binding margin such as a book is imaged on the light-receiving face of the CCD sensor by using the image scanner shown in FIGS. 2 and 3. FIG. 4B shows a case in which the copying object having a binding margin shown in FIG. 4A is put on the original document table such that a center line of the binding margin of the object becomes unparalleled to a size plate 11a located at the front end of the original document table. FIG. 4C is a schematic view for explaining the relation for correcting a position of a lens with respect to a position (lift) at which the object shown in FIG. 4A is illuminated by light emitted from a light source.

Figure 5A:
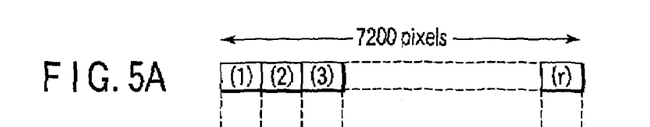
FIGS. 5A and 5B are schematic views for explaining the principle capable of achieving an example of the first embodiment of the image scanner shown in FIG. 4A.
Figure 5B:
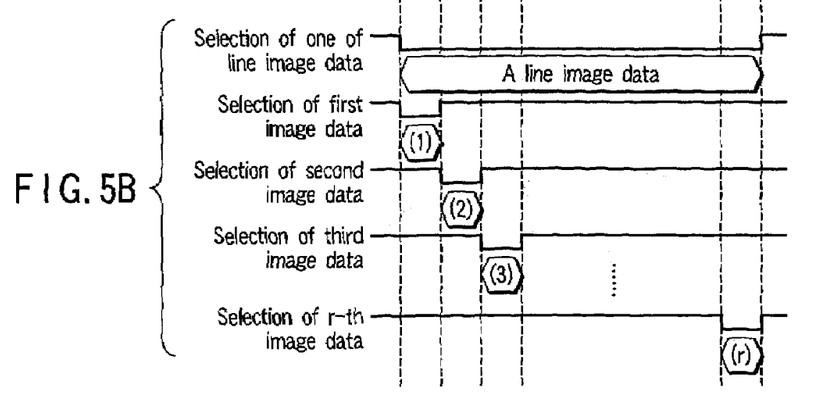

As shown in FIGS. 5A and 5B, the light-receiving face of the CCD sensor 12 and an output system of a photoelectric-conversion output are divided into r pieces in the longitudinal direction of the CCD sensor 12. In this example, because the CCD sensor 12 has 7,200 pixels, it is divided into 8 regions every 900 pixels.

An output signal of the CCD sensor 12 is outputted by a CCD driving circuit 121, converted into a digital signal by an A/D converter 123, and stored in a line memory 125. That is, the image data for one line of the object 0 is divided into 8 pieces of data by regions 12(1) to 12(r) and the 8 pieces of data are successively supplied to an image processing circuit 131.

Part of the image data for one of line of the object O is output to an AF (auto focus) control circuit 127. In this case, the image data for the line is divided into eight regions in accordance with an image data selection signal designated by a CPU 151.

More specifically, image signals divided into eight regions under reading in accordance with the control by the CCD driving circuit 121 and output from the regions 12(1) to 12(r) of the CCD sensor 121 are successively input to the AF control circuit 127.

Figure 6A:
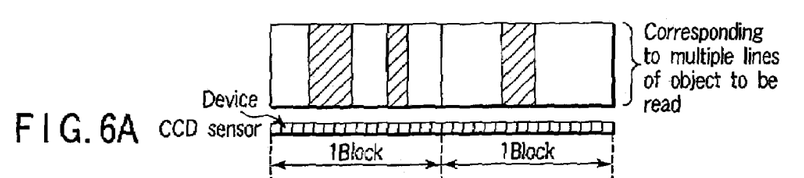
FIG. 6A is a schematic view showing an image output which is output from each of divided regions of a CCD sensor.
Figure 6B:
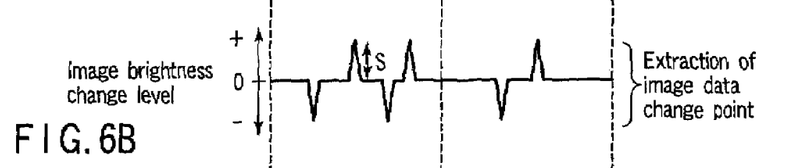
FIG. 6B is a schematic view showing an example of a change level extracting a change point of image luminance in an auto focus control section.

The AF control circuit 127 extracts a change point of image data whose image luminance is changed, i.e., a change point extraction level in which the luminance of an image is changed, from the image in an optional block of the CCD sensor 12 shown in FIG. 6A, that is, an output signal immediately after photoelectrically converted in an optional region among eight-divided regions as shown in FIG. 6B.

For example, the change point of luminance appears on the change point of black and white of the image information included in the object O in each of eight regions. Therefore, by monitoring the change of output signals in an optional region of the CCD sensor 12, it is possible to extract the change point.

As shown in FIG. 6B, the peak level "S" of the change point of luminance becomes higher under on-focus. Therefore, when a focus is properly set in a region of the object O to be scanned, the sum of levels of luminance changes of the image at the change point of luminance increases. That is, as the number of extracted points increases, the focus further coincides with the object opposite to the region.

Thus, it is found that it is enough to control the rotation of the lens motor LM and the position of the lens 18.

The moving distance of the lens 18 corresponds to a change (increment) of a focal distance due to the fact that the object O lifts from the original document table 11. Therefore, when assuming that a distance between the position of the object O illuminated by the light from the light source 13 and the original document table 11 as L, a vertical distance between the face of the original document table 11 at the object O side and the light source 13 as 1, an angle between a component of the light reflected from the object O vertical to the original document table 11 and a line segment which connects a position at which the light from the light source 13 is emitted to the object O with the light source 13 as $\theta_1$, and an angle between the component vertical to the original document table 11 and a line segment which connects a position for the light reflected from the object O to intersect with the original document table 11 with the light source 13 as $\theta_2$ (refer to FIG. 4C), the following expression is obtained.

$$(L+1) \times (1/\cos \theta_1) - 1 \times (1/\cos \theta_2) + 1$$

Moreover, a change point is extracted every region because the difference from a state in which a focus is dislocated can be made remarkable by increasing the sum of change levels of image luminance at change points and detect change points as many as possible in regions to be scanned.

Figure 6C:
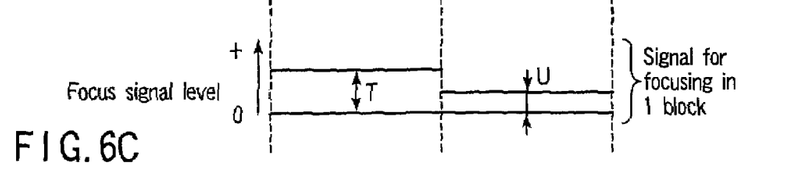
FIG. 6C is a schematic view showing an example of a focus signal level generated by the auto focus control section.

The sum of levels of luminance changes of the image shown in FIG. 6B is proportionally converted into an AF (auto focus) level, i.e., a focus signal level as shown in FIG. 6C. Thereby, a fixed level output in which a level is fixed every region of the CCD sensor 12 is generated.

Thus, focus signal levels are obtained from white and black images included in the object 0 as shown in FIGS. 6A to 6C. The focus signal levels shown in FIG. 6C shows "T" and "U" which differ every region in accordance with the ratio between black and white of the image information shown in FIG. 6A. This is because focal depths differ and received images differ in regions of the CCD sensor 12.

The AF control circuit 127 generates a motor driving signal for rotating the lens motor LM which moves the lens 18 by a predetermined angle in accordance with the focus-signal level described by referring to FIG. 6C.

Because the lens motor LM is rotated by a predetermined angle and the position of the lens 18 on the optical axis is moved toward the original document table 11 in accordance with the motor driving signal, the position of ON-focus is changed to a position more remote from the position contacting with the object 0 on the original document table 11 than the original document table 11, that is, an optional height of the object 0 not contacting with the original document table 11.

Then, image light is photoelectrically converted by the CCD sensor 12 and an image signal is input to each line memory. Subsequently, the focus signal level described by referring to FIGS. 6B and 6C is changed in accordance with the moving distance of the lens 18.

Thereafter, the lens motor LM is rotated by a predetermined angle in accordance with the motor driving signal generated by the AF control circuit 127. Thereby, a plurality of focus signal levels can be obtained every region of the CCD sensor 12.

The output of each line sensor when a focus level has the maximum value is converted into digital data by the A/D converter 123 and stored in the output image line memory 125.

Thus, image output by the CCD sensor 12 and movement of the lens 18 are repeated until an image output from each region of the CCD sensor 12 becomes on-focus every region. That is, by repeating output of the image from the CCD sensor 12 and movement of the lens 18, it is prevented that a focus is dislocated in a specific region of the object 0. Therefore, the image information in any region of the object 0 is properly imaged on the CCD sensor 12 while the lens 18 is located on-focus.

A predetermined image processing is applied to the image data stored in the output image line memory 125 by the image processing circuit 131 before the image data is output to the exposure unit 104. Moreover, it is a matter of course that a shading level for shading correction-of an image signal before input to the image processing circuit 131 is set by a shading correction circuit (not shown).

The image data every line of the CCD sensor 12 to which a predetermined image processing is applied by the image processing circuit 131 is temporarily stored in a page memory 133 in accordance with a print request from the image forming section 102 and output to the exposure unit 104 in accordance with the print-output timing. The above image forming operation by the image forming section 102 is briefly described below. That is, various portions of the image forming section 102 are first warmed up in accordance with the control by the CPU 151. Then, image data is transferred from the output-image line memory 125 to the image processing circuit 131 through an image bus 141 at a predetermined timing and a predetermined image processing is applied to the image data by the image processing circuit 131.

Subsequently, the image data to which the predetermined image processing is applied by the image processing circuit 131 is stored in the page memory 133 and a series of steps are executed including rotation of the photosensitive drum 105, charge of the photosensitive drum 105, formation of a latent image on the photosensitive drum 105 by the exposure unit 104 using the image data stored in the page memory 133, development of the image data exposed to the photosensitive drum 105 by the developing unit 106, transfer of the developed image to the sheet P, fixing of the transferred image, and the like.

Figure 7:
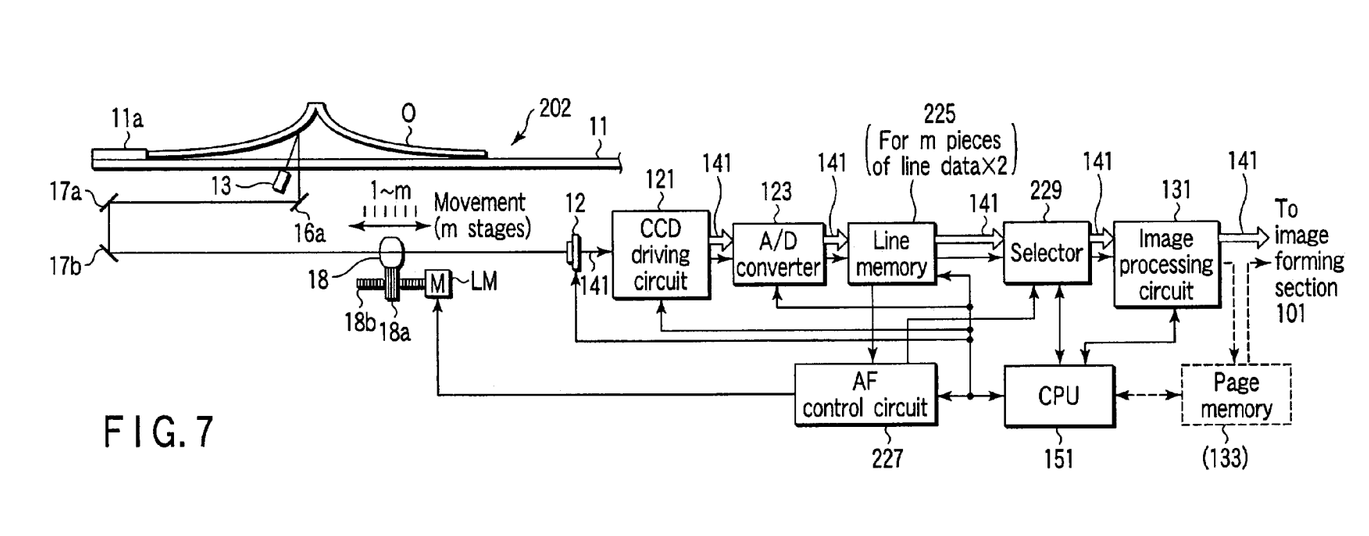
FIG. 7 is a schematic diagram for explaining an example of another embodiment of the image scanner shown in FIGS. 2 and 3.

FIG. 7 is a schematic diagram showing an example of another embodiment of the image scanner shown in FIGS. 2, 3, and 4A. A component similar to the previously described component are provided with the same symbol and its detailed description is omitted.

In the case of an image scanner 202 shown in FIG. 7, a method for moving the lens 18 is changed compared to the case of the image scanner 101 shown in FIG. 4A. Specifically, in the case of the image scanner 202 shown in FIG. 7, focuses of the lens 18 are changed in accordance with m divisions (m stages). The moving distance of the lens 18 is obtained by dividing the moving distance obtained from the condition previously described by referring to FIG. 4C, that is, the following expression into m stages.

$$(L+1) \times (1/\cos \theta_1) - 1 \times (1/\cos \theta_2) + 1$$

By dividing the step of moving the lens 18 in the optical-axis direction into m steps, the image data for one line becomes m pieces of data. Therefore, the image scanner 202 uses m line memories 225(1) to 225(r) instead of the page memory 125 shown in FIG. 4A.

In the case of the image scanner 202, AF levels of m pieces of image data (focus data) output from the line memories 225(1) to 225(r) are compared m times every region divided into R per line by the AF control circuit 227.

The AF control circuit 227 extracts the image data having the highest AF level from data of 1 to m in each of (1 to m×r) regions, that is, each of r optional regions and outputs the data as the image data in an optional region of corresponding r as the image data. The image data in an optional region of r output from the AF control circuit 227 are output to the image processing circuit 131 trough a selector 229.

The image data output from the image processing circuit 131 is supplied to the image forming section 102. In this case, the image data is output to the exposure unit 104 of the image forming section 102 at a predetermined timing, for example, synchronously with a horizontal sync signal of the image forming section 102. In this case, it is a matter of course that the line of the image data output from the AF control circuit 227 (sub-scanning directional position) and a line requested by the image forming section 102 are specified to the same line (synchronized).

Actually, the line memories 225 of 1 to m are respectively constituted by two memories. Therefore, while the image data of an optional line is output to the image processing circuit 131, r pieces of focus data corresponding to the next line are stored. That is, while the image data for one line is output from the line memory 225 to the image forming section 102, m pieces of image data are read from the CCD sensor 12 by the CCD driving circuit 121.

As described above, according to the AF control and image output control shown in FIG. 7, the image data scanned by the image scanner 202 can be output to the image forming section 102 every line at a single sync timing. Therefore, it is not necessary to set a page memory between the image processing circuit 131 and the image forming section 102.

Moreover, it is a matter of course that it is allowed that the image data output from the image processing circuit 131 is temporarily stored in a page memory as shown by a dotted line.

Figure 8:
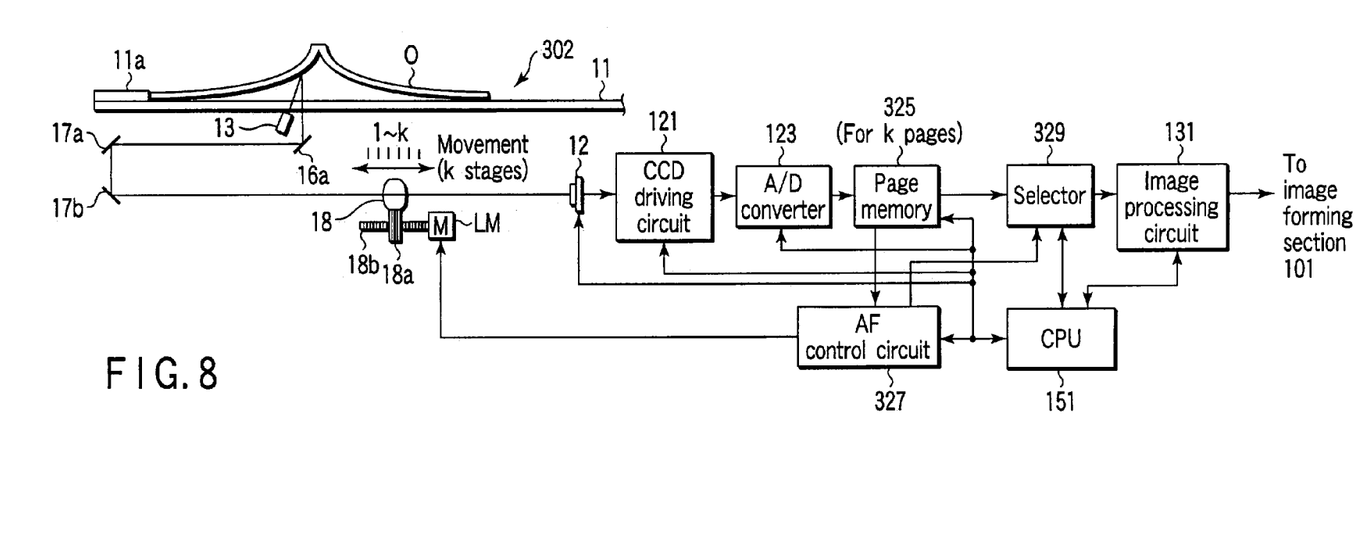
FIG. 8 is a schematic diagram for explaining an example of still another embodiment of an operation of the image scanner shown in FIGS. 2 and 3.

FIG. 8 is a schematic diagram for explaining an example of still another embodiment of the image scanner shown in FIGS. 2, 3, and 4A. A component similar to the component previously described is provided with the same symbol and its detailed description is omitted.

An image scanner 302 shown in FIG. 8 has a page memory 325 provided with a storage region for k pages. The lens 18 is moved by k stages at a predetermined interval by the lens motor LM to be rotated by a predetermined angle in accordance with the control by the CPU 151. The moving distance of the lens 18 is obtained by dividing the condition previously described by referring to FIG. 4C, that is, the moving distance obtained from the following expression into k stages.

$$(L+1) \times (1/\cos \theta_1) - 1 \times (1/\cos \theta_2) + 1$$

Specifically, the image forming apparatus 302 shown in FIG. 8 scans the image data for one page of the object O at different positions of the lens 18 k times. Therefore, k pieces of focus data (image data) per page are obtained.

The k pieces of focus data (image data) for one page are converted into digital signals by the A/D converter 123 and stored in the page memory 325 in order of corresponding scan, that is, every time of scan among k times.

AF levels of k pieces of AF focus data are compared every r regions per line by an AF control circuit 327. Then, image data having the highest AF level is output to the image processing circuit 131 through a selector 329 as image data of the corresponding region.

The image data output from the image processing circuit 131 is directly synchronized with the output-signal timing of the image forming section 102 and output toward the image forming section 102.

Thus, it is possible to raise an image scanning rate by storing the image data output from the CCD sensor 12 in the page memory 325 k times (k pieces of data) for one page of image information (object), comparing k AF levels every r-divided regions, and selecting the best image.

As a result, because it is not necessary to synchronize the scanning operation with a printer, it is possible to accelerate the scanning operation.

Figure 9:
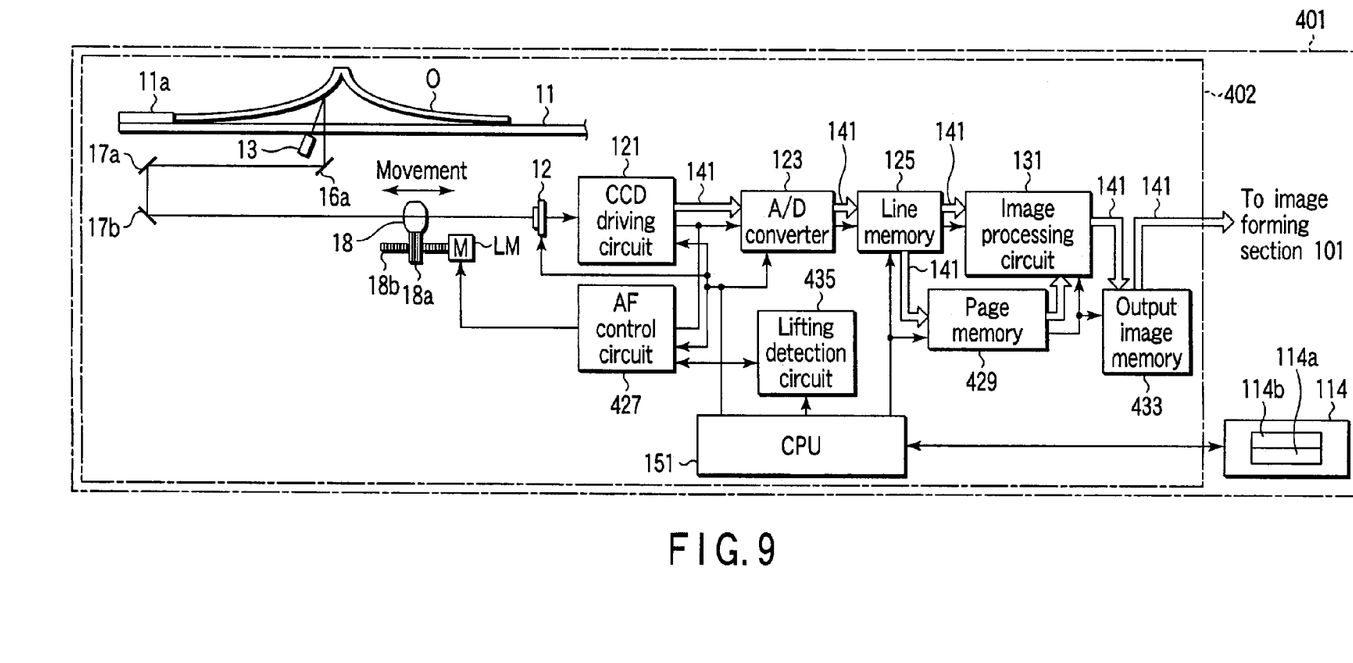
FIG. 9 is a schematic diagram for explaining an example of still another embodiment of the operation of the image scanner shown in FIGS. 2 and 3.

FIG. 9 is a schematic diagram for explaining an example of still another embodiment of the image scanner shown in FIGS. 2, 3, and 4A. A component similar to the component described by referring to FIG. 4A is provided with the same symbol and its detailed description is omitted.

In the case of an image scanner 402 shown in FIG. 9, the lens 18 is moved in the optical-axis direction in a lot of fine steps which can be regarded as the predetermined number of stages or substantially continuous movement.

The image information output from the CCD driving circuit 121 and scanned by the CCD sensor 12 is stored in the line memory 125 by the A/D converter 123. Then, the lens motor LM is rotated by a predetermined angle in accordance with a motor driving signal generated by an AF control circuit 427. Thereby, a plurality of focus-signal levels can be obtained for each of r-divided regions of the CCD sensor 12.

Image signals having the highest AF level are stored in r regions of a page memory 429 from the AF control circuit 427 by r signals per line. Therefore, the first and second carriages 16 and 17 are moved at least by the length of the object O along the original document table 11, so that matrix-shaped image data defined by (length of object O/scanning length per line)×(r) are stored in the page memory 429.

Moreover, an image signal having the highest AF level is supplied from the AF control circuit 427 to a lifting detection circuit 435.

The lifting detection circuit 435 discriminates that there is a gap between the original document table 11 and the object 0 though the AF data shows the maximum value by counting the number of motor control pulses supplied from the AF control circuit 427 to the lens motor M and thereby detecting at which position of the lens 18 the image data stored in the page memory 429 is fetched.

The image data corresponding to an original document lift position detected by the lifting detection circuit 435 among the image data temporarily stored in the page memory 429 and supplied to the image processing circuit 131 is output as a blank portion in which there is no image data or the binding margin of a book by assuming that the object 0 is not a sheet but a recessed portion of a three-dimensional object in accordance with the control by, for example, the CPU 151. That is, when the image data corresponding to a clear unnecessary image region though amount of lift of the object such as the binding margin of a book occurs is included in the image data output from the AF control circuit 427, it is possible to delete the image data in the unnecessary image region in accordance with the control by the CPU 151.

It is possible to input a local-deletion designation for deleting the image data in the unnecessary image region of a binding margin into the CPU 151 from an input terminal (operation panel) 114 previously set to a digital copying machine 401.

For example, when the object O is an opened book, a division copy (continuous photographing of pages) key 114a capable of designating division copies to be output to two sheets by using a binding margin (almost center of the object) as a boundary is frequently provided for the operation panel 114. Therefore, when the division copy key 114a is turned on, it is possible to delete the image data output from the AF control circuit 427 by the data for a predetermined section at almost the center of the size of the object O detected by the object size detecting routine for detecting the size of the object O (not described in detail).

Moreover, in order to decrease the time requested to scan the image information of the object O set onto the original document table 11, when the object O is a sheet-like object and is supplied to the original document table 11 by the ADF 103, it is allowed to cancel the above-described AF control (extraction of focus dislocation from focus-signal data).

When the object O is not supplied from the ADF 103 but the object O mounted on the original document table 11 has a large thickness, a gap is not frequently produced between the object O and the original document table 11. Therefore, only when it is designated by a book key 114b that the object O is an opened book, it is allowed to execute the above AF control.

In this case, because the gap is produced between the original document table 11 and the book at almost the center of the moving distance of the first carriage 16, it is possible to further decrease the time requested to scan image information by executing the above AF control at almost the center of the book.

Start and end positions of the AF control can be easily detected by counting the number of pulses (number of revolutions of motor CM) supplied to the motor CM (refer to FIG. 3) since the switch plate 16c (refer to FIG. 2) was detected by the home position sensor HP.

As described above, an image scanner of the present invention makes it possible to set a focus every specific region when obtaining image data from an object. In other words, because the image information on the object imaged on a CCD sensor is fetched as image data a plurality of times while changing positions of a lens, image data having the highest focus-signal level is extracted, and an image is formed in accordance with the image data. In this way, it is prevented that an undesired copy locally having focus dislocation is output. Accordingly, even when the object is set on an original document table so as to be unparalleled to a direction in which a light receiving element of a CCD sensor is extended, it is possible to capture an image removing method without losing the sharpness.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image scanner comprising:
   a photoelectric conversion element which has a light-receiving face and outputs an electrical signal corresponding to a contrast of light emitted to the light-receiving face;
   an optical unit including a light source, a lens, and a plurality of mirrors which guide the light reflected from an object to which the light from the light source is emitted and thereby which is illuminated, the lens imaging the reflected light on the light-receiving face of the photoelectric conversion element;
   a photoelectric conversion element driving circuit which drives the photoelectric conversion element and fetches the electrical signal at a predetermined timing;
   a lens moving mechanism which moves the lens in an optical-axis direction by a predetermined distance; and
   a focus control circuit which generates a focus signal capable of setting an optimum position of the lens in accordance with the electrical signal output from the photoelectric conversion element and which outputs a lens moving signal showing a distance for the lens moving mechanism to move the lens in accordance with the focus signal,
   wherein the focus control circuit detects that a distance between the light-receiving face of the photoelectric conversion element and the object is different from a reference value and generates the lens moving signal for moving the lens a predetermined distance by a predetermined distance.

2. The image scanner according to claim 1, wherein the focus control circuit extracts a luminance signal from the electrical signal obtained from the photoelectric conversion element and generates the lens moving signal.

3. The image scanner according to claim 1, wherein the light-receiving face of the photoelectric conversion element is extended in a predetermined direction, and
   the photoelectric conversion element driving circuit can output the electrical signal every divided region obtained by dividing the light-receiving face into a plurality of regions.

4. The image scanner according to claim 3, further comprising:
   a memory having a plurality of storage regions which store the electrical signal output from the photoelectric conversion element every the divided region of the photoelectric conversion element.

5. The image scanner according to claim 4, wherein the focus control circuit extracts a luminance signal from the electrical signal output every the divided region obtained from the photoelectric-conversion driving circuit and generates the lens moving signal.

6. The image scanner according to claim 4, further comprising:
   a second memory having a plurality of storage regions which store the electrical signal output every the divided region of the photoelectric conversion element from the photoelectric conversion element driving circuit every predetermined step when the lens is moved every the predetermined step.

7. The image scanner according to claim 6, wherein the focus control circuit extracts a luminance signal every the divided region obtained from the photoelectric conversion element driving circuit and from each of the "number of regions x number of steps" electrical signals output every the predetermined step and generates the lens moving signal every the "number of regions x number of steps" portions obtained by multiplying the number of regions by the number of steps.

8. The image scanner according to claim 7, wherein the focus control circuit generates the lens moving signal in accordance with an output showing the maximum output every the "number of regions x number of steps" portions.

9. An image scanner comprising:
   a charged-coupled device (CCD) sensor which converts the image information on an object into an image signal;
   an illuminating unit which illuminates the object;
   a first mirror which guides image light which is the contrast of the light including the image information generated from the object illuminated by the illuminating unit in a predetermined direction;
   a second mirror which guides the image light transmitted from the first mirror in a predetermined direction;

a third mirror which guides the image light transmitted by the second mirror in a predetermined direction;

a lens which images the image light transmitted by the third mirror on the CCD sensor;

a first mirror moving mechanism which movably holds the first mirror and the illuminating unit and is movable along the image information on the object;

a second mirror moving mechanism which movably holds the second mirror and the third mirror and is movable by one half of a distance in which the first mirror moving mechanism is moved due to the movement of the first mirror moving mechanism;

a driving unit for generating a thrust for moving the first and second mirror moving mechanisms in predetermined directions;

a lens moving mechanism for moving the lens in the optical-axis direction a predetermined distance by a predetermined distance;

a memory device capable of storing the electrical signal output from the CCD sensor in any one of the following forms:

a) in the sequence corresponding to the arrangement of light-receiving elements of the CCD sensor and every region divided into several light-receiving elements, b) a plurality of electrical signals every same region about the sequence corresponding to the arrangement of light-receiving elements of the CCD sensor and a region unit divided every several light-receiving elements, and c) capable of holding a plurality of image data about scanning information on all scanning-object regions of the same object in the sequence corresponding to the arrangement of the light-receiving elements of the CCD sensor and including a region unit divided every several light-receiving elements;

a focus control circuit which outputs a lens moving signal showing the distance for moving the lens moving mechanism every predetermined step and which outputs a selection signal for selecting the image data in the region of a step having the largest focus signal from the image data output from the CCD sensor and stored in the memory device at the position of the lens moved every step; and an output image memory including a control circuit which holds image data in which a focus is not dislocated every region unit and constructs output image data by successively outputting any image data of a) image data in the region units, b) a plurality of image data every same region in the region units, and c) a plurality of image data about the scanning information on all object regions of the same object in the region units.

10. The image scanner according to claim 9, wherein the focus control circuit extracts a luminance signal from the electrical signal of any one of the forms output from the memory device and generates the selection signal.

11. The image scanner according to claim 9, wherein the focus control circuit detects that a distance between the light-receiving face of the CCD sensor and the object is different from a reference value and generates the selection signal for moving the lens by a predetermined distance.

12. The image scanner according to claim 9, wherein the light-receiving face of the photoelectric conversion element is extended in a first direction parallel with an optional side of the object.

13. The image scanner according to claim 12, wherein the driving unit moves the first and second mirror-driving mechanisms in a second direction orthogonal to the first direction in which the light-receiving face is extended.

14. The image scanner according to claim 13, wherein the focus control circuit extracts a luminance signal from each of "number of regions x number of steps" electrical signals output every predetermined step every the divided region output from the memory device in the above optional form and when the lens is moved every predetermined step and generates the selection signal every portions of "number of regions x number of steps" obtained by multiplying the number of regions by the number of steps.

* * * * *